(12) United States Patent
Matsubara

(10) Patent No.: US 9,940,699 B2
(45) Date of Patent: Apr. 10, 2018

(54) IMAGE PROCESSING APPARATUS CAPABLE OF APPROPRIATE IMAGE CONVERSION IN ALL REGIONS OF AN IMAGE IN IMAGE TRANSFORMATION PROCESSING

(71) Applicant: CASIO COMPUTER CO., LTD., Tokyo (JP)

(72) Inventor: Masao Matsubara, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/061,145

(22) Filed: Mar. 4, 2016

(65) Prior Publication Data

US 2016/0350896 A1 Dec. 1, 2016

(30) Foreign Application Priority Data

May 28, 2015 (JP) .................................. 2015-109026

(51) Int. Cl.
*G06K 9/40* (2006.01)
*G06T 5/00* (2006.01)
(Continued)

(52) U.S. Cl.
CPC .............. *G06T 5/003* (2013.01); *G06T 5/50* (2013.01); *G06T 7/246* (2017.01); *G06T 2207/10016* (2013.01); *G06T 2207/20201* (2013.01)

(58) Field of Classification Search
USPC ............... 382/255, 100; 345/581, 589, 619; 348/335; 396/87; 600/509, 516, 523
See application file for complete search history.

(56) References Cited

U.S. PATENT DOCUMENTS 7,538,774 B2 * 5/2009 Kunita ................... G06T 7/593
345/581
9,470,966 B2 * 10/2016 Sumiyoshi ............. G03B 21/26
(Continued)

FOREIGN PATENT DOCUMENTS

JP        2011-97217 A      5/2011

*Primary Examiner* — Anh H Do
(74) *Attorney, Agent, or Firm* — Fitch Even Tabin & Flannery LLP

(57) ABSTRACT

A projection conversion coefficient acquirer of an image processing apparatus acquires the same number of projection conversion coefficients, which are coefficients for doing projection conversion of an image, as the number of a plurality of reference points at differing positions in the image. A post-projection-conversion image acquirer does projection conversion on the image through each of the projection conversion coefficients, of which there are the same number as the number of the plurality of reference points acquired by the projection conversion coefficient acquirer, and acquires a plurality of post-projection-conversion images from the image, the number of the post-projection-conversion images being the same as the number of reference points. A weighted averager finds a weighted average for each of the coordinates of pixels comprising the plurality of post-projection-conversion images, using a plurality of weightings determined in accordance with distance from the plurality of reference points in the image. A weighted average image acquirer acquires a weighted average image in which the plurality of post-projection-conversion images have undergone weighted averaging by the weighted averager.

17 Claims, 7 Drawing Sheets

(51) Int. Cl.
*G06T 5/50* (2006.01)
*G06T 7/246* (2017.01)

(56) References Cited

U.S. PATENT DOCUMENTS

| | | | | |
|---|---|---|---|---|
| 9,524,696 B2 * | 12/2016 | Nakata | .................... | G09G 5/10 |
| 9,532,018 B2 * | 12/2016 | Ishikawa | ................ | G06T 3/005 |
| 9,575,125 B1 * | 2/2017 | Andre | .................... | G11C 29/10 |
| 9,600,869 B2 * | 3/2017 | Chiang | .................. | G06T 5/005 |
| 9,602,960 B2 * | 3/2017 | Alsehly | .................. | H04W 4/02 |

* cited by examiner

FIG. 2
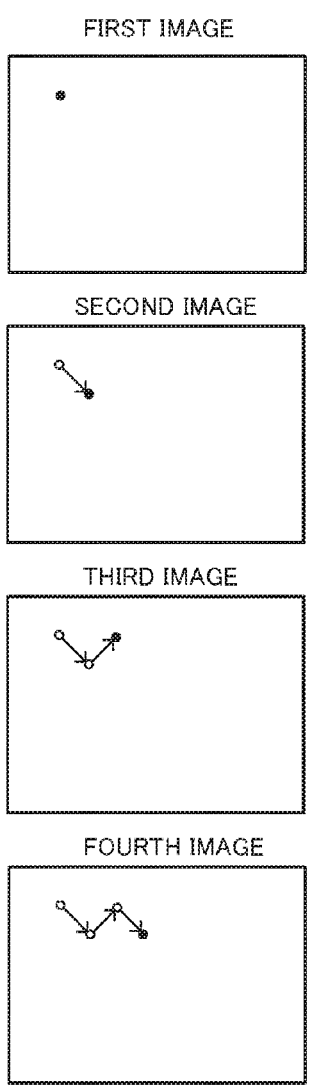
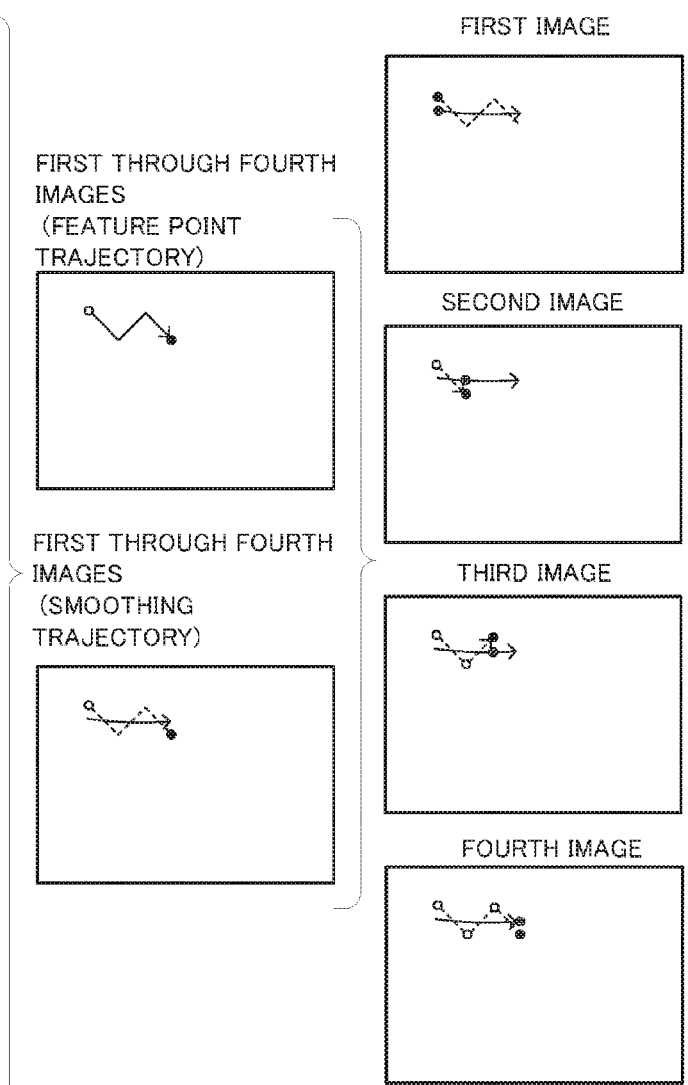

REFERENCE POINT

IMAGE PROCESSING APPARATUS CAPABLE OF APPROPRIATE IMAGE CONVERSION IN ALL REGIONS OF AN IMAGE IN IMAGE TRANSFORMATION PROCESSING

CROSS-REFERENCE TO RELATED APPLICATION

This application claims the benefit of Japanese Patent Application No. 2015-109026, filed on May 28, 2015, the entire disclosure of which is incorporated by reference herein.

FIELD

This application relates generally to an image processing apparatus capable of appropriate image conversion in all areas of an image in image transformation processes.

BACKGROUND

Recently, correction of blurring in video comprising a plurality of images (frames) has been accomplished through digital technology.

As a method of blur correction in videos, art for extracting feature points in four corners of an image and accomplishing projection conversion of the image using the amount of movement of the feature points of the four corners is disclosed for example in Unexamined Japanese Patent Application Kokai Publication No. 2011-97217.

SUMMARY

An image processing apparatus according to the present application comprises a processing unit, wherein the processing unit executes:

a projection conversion coefficient acquisition process that acquires projection conversion coefficients that are coefficients for doing projection conversion on an image, the number of such coefficients being the same as the number of a plurality of reference points at differing positions in the image;

a post-projection-conversion image acquisition process that does projection conversion on the image through the respective projection conversion coefficients of the same number as the number of the plurality of reference points, acquired by the projection conversion coefficient acquisition process, and acquires the same number of post-projection-conversion images from the image as the number of reference points;

a weighted average process that finds a weighted average of the plurality of post-projection-conversion images using a plurality of weightings determined in accordance with distances from the plurality of reference points in the image; and a weighted average image acquisition process that acquires a weighted average image in which a weighted average of the plurality of post-projection-conversion images was made by the weighted average process.

BRIEF DESCRIPTION OF THE DRAWINGS

A more complete understanding of this application can be obtained when the following detailed description is considered in conjunction with the following drawings, in which:

FIG. 2 is an overview diagram showing one example of feature point trajectories and smoothing trajectories;

DETAILED DESCRIPTION

An exemplary embodiment of the present disclosure is described below with reference to the drawings.

Figure 1:
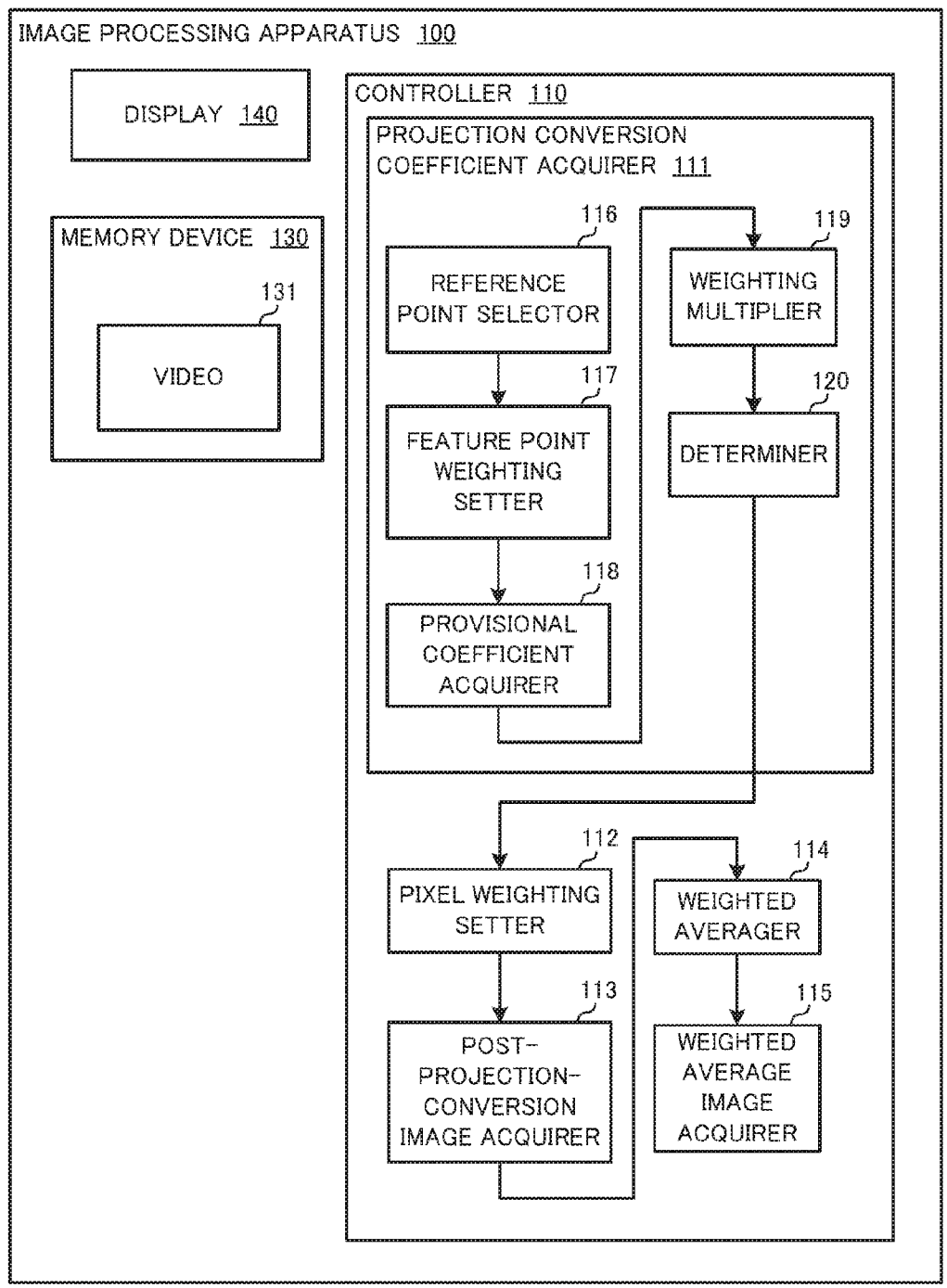
FIG. 1 a block diagram showing a configuration of an image processing apparatus.

As shown in FIG. 1, an image processing apparatus 100 is, for example, a personal computer (PC) and comprises a controller 110, a memory device 130 and a display 140. The image processing apparatus 100 accomplishes image processing for each of the images (each of the frames) that make up the video 131. In particular, the image processing apparatus 100 according to this exemplary embodiment accomplishes, as image processing, projection conversion that transforms an image. Projection conversion coefficients for accomplishing the projection conversion are obtained using a plurality of pairs each comprising a feature point indicating a feature of the image, and a smoothing point on a smoothing trajectory that smooths the feature point trajectory in a video containing the image.

Below, a pre-process for finding the feature points and smoothing points accomplished in advance of the projection conversion is described with reference to the overview diagram of FIG. 2. This pre-process is commonly known art, and thus is described below as a general consideration separate from the configuration for projection conversion according to the present exemplary embodiment shown in FIG. 1. In addition, for ease in understanding, in FIG. 2 a case in which there is one feature point indicated as a black dot is described as an example, but an image (frame) comprising an actual video contains a plurality of feature points.

First, in the first image, which is a frame comprising a video, a feature point is extracted, as shown by the feature point trace in FIG. 2. The feature point is a point feature in the image as an angle of an object or an intersection of line segments. The feature point is extracted from the image for example using an algorithm such as the Harris/Plessey method, the KLT method, the Hessian method and/or the like.

Next, the feature point thus extracted is traced chronologically across the second through fourth images. The feature point trace is accomplished for example using an algorithm that uses concentration gradient, block matching and/or the like.

Through the feature point trace, a zig-zag feature point trajectory is obtained in the first through fourth images shown in FIG. 2. By smoothing the feature point trajectory, the smoothed trajectory of the first through fourth images indicated by a solid line is obtained. This smoothing is accomplished using a low-pass filter, for example.

Through this, smoothing points (o's and x's) on the smoothed trajectory corresponding to the feature points are obtained in each image, as indicated by the feature points and the smoothing points in FIG. 2. The feature point and the smoothing point form a pair, and by accomplishing an image transformation process (in this exemplary embodiment, projection conversion in particular) that causes the feature point to move to the smoothing point on each image, blur correction of the video is accomplished. In actuality, a plurality of feature points in the image is caused to move to the respectively corresponding smoothing points.

The above is the pre-process accomplished in advance of projection conversion.

Below, a configuration according to a projection conversion is described with reference to FIG. 1, with the pre-process as a prerequisite.

First, the memory device 130 is a non-volatile memory such as a hard disk drive (HDD) and/or the like. This memory device 130 stores a video 131. The video is for example a video shot at a prescribed frame rate by a photography apparatus (camera), on which the pre-process has been undertaken. Consequently, each image comprising the video 131 contains a plurality of feature points and a plurality of smoothing points respectively corresponding to the plurality of feature points.

Next, the display 140 comprises a display such as a liquid crystal or organic electroluminescence (EL) display, and/or the like, and a light source such as backlight and/or the like for uniformly illuminating the display.

Next, the controller 110 comprises a processing unit, read only memory (ROM), random access memory (RAM) and/or the like. The processing unit of the controller 110 realizes various functions (a projection conversion coefficient acquirer 111, a pixel weighting setter 112, a post-projection-conversion image acquirer 113, a weighted averager 114 and a weighted average image acquirer 115) by reading and executing programs for projection conversion stored in the ROM.

Figure 3:
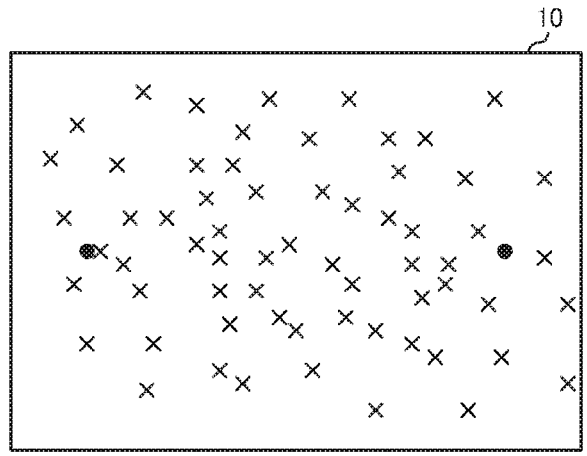
FIG. 3 is a drawing showing one example of feature points and reference points in an image.

The projection conversion coefficient acquirer 111 acquires projection conversion coefficients, which are coefficients for accomplishing projection conversion of the image, in the same number as the plurality of reference points at differing positions in the image. FIG. 3 shows one example of a plurality of reference points in an image 10. In the figure, the x's represent feature points and the black dots represent reference points (left reference point and right reference point). The smoothing points that are paired with each of the feature points are not shown in the drawing for convenience in explanation, but the explanation will assume that there is a smoothing point paired with each of the feature points (each x). Also, for the sake of differentiation, any images described hereinafter are simply referred to as "image" when it is not necessary to give special designation to the image 10 shown in FIG. 3.

In this exemplary embodiment, the projection conversion coefficient acquirer 111 acquires two projection conversion coefficients, being the same number as the number of reference points, from the reference points (left reference point and right reference point) respectively positioned near two opposites sides, out of the four sides of the image 10. The specific acquisition method for the projection conversion coefficients is described below.

Figure 4:
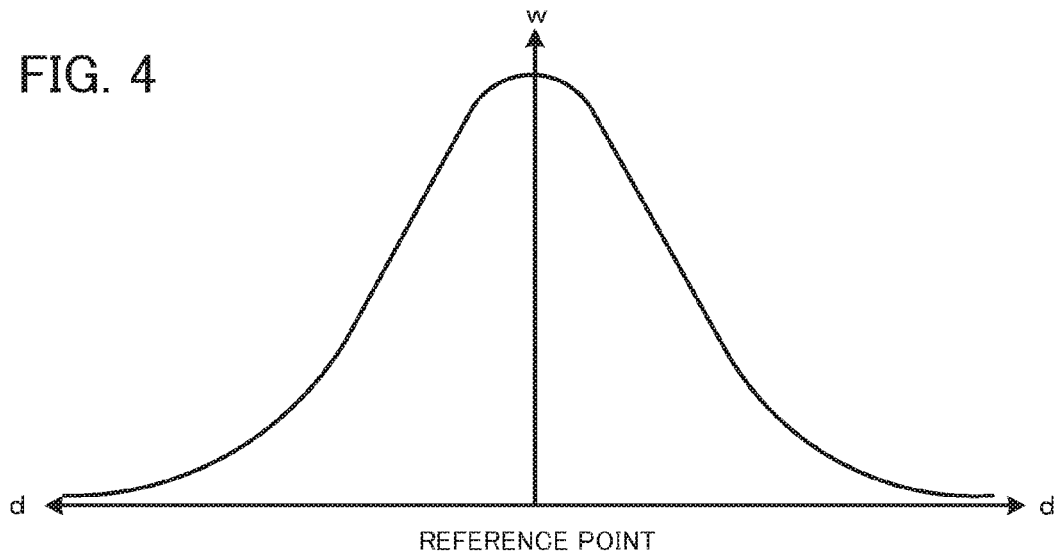
FIG. 4 is a drawing showing one example of a normal distribution of weighting.

Next, the pixel weighting setter 112 sets a plurality of weightings for the coordinates of pixels comprising the image, the weightings differing in accordance to the distance of the coordinates from the plurality of reference points. In this exemplary embodiment, the pixel weighting setter 112 sets, for the coordinates ($x_i$, $y_i$) of the pixels comprising the image 10, two weightings in accordance with the distance from those coordinates to the right reference point and the distance to the left reference point. The weightings follow a normal distribution. That is to say, the weighting (w) is larger the closer the distance (d) from the reference point to the pixel, and the weighting (w) approaches 0 the farther from the reference point, as shown in FIG. 4.

The pixel weighting setter 112 sets weightings that differ in accordance with distance from the two reference points (right reference point and left reference point), for the respective coordinates ($x_{imin\sim imax}$, $y_{imin\sim imax}$) of all of the pixels in the image 10. Here, i is a natural number 1 or larger, and is a value associated with the coordinate position of the pixel. The minimum value $i_{min}$ of i is 1, and the maximum value $i_{max}$ of i is the same value as the number of pixels.

Next, the post-projection-conversion image acquirer 113 performs projection conversion on the image and acquires from the image a plurality of post-projection-conversion images in the same number as the number of reference points, by the same number of projection conversion coefficients as the number of the plurality of reference points acquired by the projection conversion coefficient acquirer 111. In this exemplary embodiment, the post-projection-conversion image acquirer 113 performs image conversion on the image 10 through two projection conversion coefficients, being the same number as the two reference points (the right reference point and the left reference point), and acquires two post-projection-conversion images from the image 10.

Next, the weighted averager 114 finds a weighted average using the plurality of weightings determined in accordance with the distance of the respective coordinates of the pixels comprising the plurality of post-projection conversion images from the plurality of reference points in the image. In this exemplary embodiment, the weighted averager 114 makes a weighted average of the coordinates of the pixels comprising the two post-projection-conversion images.

Specifically, the weighted averager 114 makes a weighted average of the coordinates of the corresponding pixels among the two post-projection-conversion images (for example, the coordinates ($x'_i$, $y'_i$) of the pixels in one of the post-projection-conversion images and the coordinates ($x''_i$, $y''_i$) of the pixels in the other post-projection-conversion image) using two weightings (for example, w' and w'') set by the pixel weighting setter 112 on the coordinates ($x_i$, $y_i$) of the original pixels of the corresponding pixels in the image 10.

Next, the weighted average image acquirer 115 acquires a weighted average image in which a weighted average has been found for the coordinates of the pixels comprising the plurality of post-projection-conversion images by the weighted averager 114. Specifically, the weighted average image acquirer 115 acquires a weighted average image comprising pixels at post-weighted-average coordinates. In the example of the one and the other post-projection-conversion images described above, the weighted average image acquirer 115 acquires a weighted average image comprising pixels at the post-weighted-averaging coordinates (w'x'$_i$+w"x"$_i$/w'+w", w'y'$_i$+w"y"$_i$/w'+w"). That is to say, a weighted average image with weighted averaging done using weighting on each of the coordinates of all corresponding pixels in the one and the other post-projection-conversion images is acquired.

From the above, the image processing apparatus 100 (1) acquires the same number of projection conversion coefficients as the plurality of reference points in the image, (2) accomplishes projection conversion of the image using the same number of projection conversion coefficients as the acquired reference points, and (3) makes a weighted average of the coordinates of the pixels comprising the same number of post-projection-conversion images as the reference points, using the same number of weightings as the reference points. Below, a specific acquisition method for the projection conversion coefficients of (1) above is described.

The projection conversion coefficient acquirer 111 comprises a reference point selector 116, a feature point weighting setter 117, a provisional coefficient acquirer 118, a weighting multiplier 119 and a determiner 120.

The reference point selector 116 selects one reference point out of the plurality of reference points. In this exemplary embodiment, the reference point selector 116 selects one out of either the right reference point or the left reference point.

Figure 5:
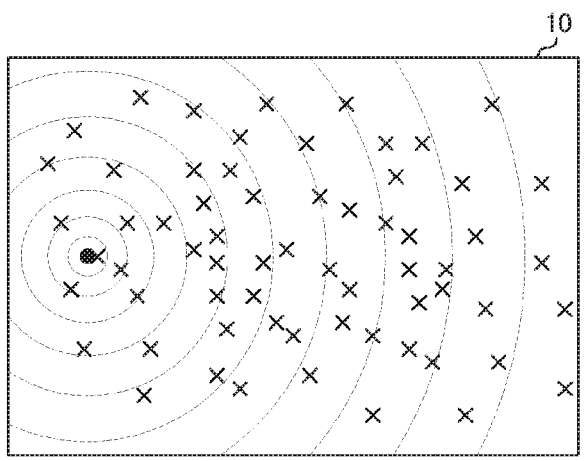
FIG. 5 is a drawing showing one example of weighting from a left reference point.

Next, the feature point weighting setter 117 sets weightings that differ in accordance to distance from the one reference point selected by the reference point selector 116, for the respective coordinates of all feature points included in the image. For example, when the reference point selector 116 has selected the left reference point, the feature point weighting setter 117 sets a weighting following the normal distribution shown in FIG. 4 for the respective coordinates of all of the feature points included in the image 10, as shown in FIG. 5. In other words, as the rings shown in the drawing spread, small weightings are set for the coordinates of the feature points. The weighting (w) is calculated using equation (1) below.

[Formula 1]

$$w = e^{-\frac{(x_i-x_0)^2+(y_i-y_0)^2}{2\sigma^2}} \quad \text{(Eq. 1)}$$

In equation (1), ($x_0$, $y_0$) are the reference point coordinates, ($x_i$, $y_i$) are the coordinates of pixels in the image 10 and $\sigma$ is an arbitrary constant. The feature point weighting setter 117 sets the weighting for one of the feature points by substituting the coordinates of the feature point for ($x_i$, $y_i$) and the coordinates of the left reference point for ($x_0$, $y_0$). Then, the feature point weighting setter 117 sets the weightings for each of the coordinates of all feature points contained in the image 10 of FIG. 5.

Next, the provisional coefficient acquirer 118 acquires provisional coefficients for projection conversion on the basis of four pairs arbitrarily selected from among the plurality of pairs comprising smoothing points and feature points included in the image.

The provisional coefficients are acquired through equation (2) below.

[Formula 2]

$$\begin{pmatrix} X_1 \\ X_2 \\ X_3 \\ X_4 \\ Y_1 \\ Y_2 \\ Y_3 \\ Y_4 \end{pmatrix} = \begin{pmatrix} x_1 & y_1 & 1 & 0 & 0 & 0 & -X_1x_1 & -X_1y_1 \\ x_2 & y_2 & 1 & 0 & 0 & 0 & -X_2x_2 & -X_2y_2 \\ x_3 & y_3 & 1 & 0 & 0 & 0 & -X_3x_3 & -X_3y_3 \\ x_4 & y_4 & 1 & 0 & 0 & 0 & -X_4x_4 & -X_4y_4 \\ 0 & 0 & 0 & x_1 & y_1 & 1 & -Y_1x_1 & -Y_1y_1 \\ 0 & 0 & 0 & x_2 & y_2 & 1 & -Y_2x_2 & -Y_2y_2 \\ 0 & 0 & 0 & x_3 & y_3 & 1 & -Y_3x_3 & -Y_3y_3 \\ 0 & 0 & 0 & x_4 & y_4 & 1 & -Y_4x_4 & -Y_4y_4 \end{pmatrix} \begin{pmatrix} a \\ b \\ c \\ d \\ e \\ f \\ g \\ h \end{pmatrix} \quad \text{(Eq. 2)}$$

Here, (x1~x4, y1~y4) are the coordinates of the four feature points. In addition, (X1~X4, Y1~Y4) are the coordinates of the smoothing points that are respectively paired with the four feature points. In addition, (a, b, c, d, e, f, g, h) are the provisional coefficients for projection conversion. As is clear from this equation (2), in finding the projection conversion coefficients for projection conversion, four pairs of feature points and smoothing points are necessary.

In this exemplary embodiment, the provisional coefficient acquirer 118 acquires provisional coefficients for doing projection conversion on the image 10 on the basis of four arbitrarily selected pairs out of the plurality of pairs, each pair consisting of a smoothing point and a feature point (x marks) contained in the image 10 of FIG. 5.

Next, the weighting multiplier 119 multiplies the weighting respectively set for the coordinates of all of the feature points by the respective distances between the coordinates after projection conversion of all feature points obtained through projection conversion of the coordinates of all feature points and the coordinates of the smoothing points respectively paired with all of the feature points, using the provisional coefficients obtained by the provisional coefficient acquirer 118.

The weighting multiplier 119 first does a projection conversion on the coordinates of the feature points through equation (3) below, using the acquired provisional coefficients (a, b, c, d, e, f, g, h).

[Formula 3]

$$\left(x' = \frac{ax_i + by_i + c}{gx_i + hy_i + 1}, \; y' = \frac{dx_i + ey_i + f}{gx_i + hy_i + 1}\right) \quad \text{(Eq. 3)}$$

Here, ($x_i$, $y_i$) are the coordinates of the pixels in the image 10, and the coordinates of the feature points are substituted in for the value of i. In addition, (x', y') are the coordinates after projection conversion. The weighting multiplier 119 finds the coordinates (x', y') after projection conversion by substituting the provisional coefficients (a, b, c, d, e, f, g, h) and the coordinates of one of the feature points out of the all feature points, into equation (3).

For example, the weighting multiplier 119 finds post-projection-conversion coordinates by doing projection conversion on the coordinates of one arbitrarily selected feature point, out of the coordinates (x1, y1) to (x64, y64) of all 64 feature points in FIG. 5. For example, the post-projection-conversion coordinates (x'5, y'5) are found from the coordinates (x5, y5) of a feature point.

In addition, the weighting multiplier 119 finds the distance (difference) from the post-projection-conversion coordinates (x'5, y'5) to the coordinates (X5, Y5) of the smoothing point paired with the coordinates (x5, y5) of the feature point. Then, this distance is multiplied by a weighting (w) set for the coordinates (x5, y5) of the feature point found by equation (1). In this case, the weighting is larger for feature points whose distance is closer to the left reference point shown in FIG. 5, so the multiplier value for multiplying the weighting by the distance is larger. That is to say, the penalty when a difference emerges is large.

In this manner, the weighting multiplier 119 does projection conversion on the coordinates (x1, y1)~(x64, y64) of all feature points, and finds the distance between the post-projection-conversion coordinates (x'1, y'1)~(x'64, y'64) and the coordinates (X1, Y1)~(X64, Y64) of the paired smoothing points. Then, the weighting multiplier 119 multiplies each of the plurality of distances found by a weighting (w) set for (x1, y1)~(x64, y64).

When projection conversion is done on the coordinates (x1, y1)~(x4, y4) of the feature points selected when finding the provisional coefficients, the post-projection-conversion coordinates (x'1, y'1)~(x'4, y'4) match the coordinates (X1, Y1)~(X4, Y4) of the smoothing points, so the distance (difference) is 0. When all feature points have undergone projection conversion, provisional coefficients that minimize the sum of the distances between all smoothing points and all feature points after projection conversion are ideal, so in this exemplary embodiment, provisional coefficients such that feature points close to the reference points become closer to the smoothing points by further setting a penalty through weightings are selected as projection conversion coefficients.

Returning now to FIG. 1, the determiner 120 determines whether to make a provisional coefficient one of the projection conversion coefficients for the selected one reference point, on the basis of the sum of the values found by the weighting multiplier 119 multiplying the weighting by each of the distances. For example, by determining whether or not the above-described sum is a minimum, the determiner 120 determines whether to make the provisional coefficients found from the four pairs (feature point coordinates (x1~x4, y1~y4) and smoothing point coordinates (X1~X4, Y1~Y4)) arbitrarily selected from all feature points one of the projection conversion coefficients for the left reference point.

In other words, the determiner 120 makes the provisional coefficient whose above-described sum is smallest one of the projection conversion coefficients for the one reference point selected, from among the plurality of provisional coefficients the provisional coefficient acquirer 118 acquired by changing pairs (that is to say, changing at least one pair out of the four pairs to a different pair from the four pairs). This process of the determiner 120 can be called an optimization process that finds one provisional coefficient whose sum is a minimum, from among the plurality of provisional coefficients obtained by changing pairs. The process of the determiner 120 is described in detail further below.

The above is the flow of the projection conversion coefficient acquisition process up to one projection conversion coefficient being acquired for one reference point, by each component of the projection conversion coefficient acquirer 111. The projection conversion coefficient acquirer 111 acquires one projection conversion coefficient for the selected one reference point by repeating a projection conversion coefficient acquisition process comprising the various processes of the feature point weighting setter 117, the provisional coefficient acquirer 118, the weighting multiplier 119 and the determiner 120 whenever the reference point selector 116 selects one reference point. Through this, the same number of projection conversion coefficients as the number of the plurality of reference points (in this exemplary embodiment, two reference points, namely the left reference point and the right reference point) is acquired.

Next, the projection conversion coefficient acquisition process executed by the projection conversion coefficient acquirer 111 is described with reference to FIG. 6. The projection conversion coefficient acquisition process is started when a user commands execution of the projection conversion process, for a video 131 that has already undergone the pre-process. This is intended to be illustrative and not limiting, for naturally it would be fine to execute the pre-process and the projection conversion process sequentially for the video 131 on the basis of commands from the user.

First, the projection conversion coefficient acquirer 111 determines whether or not there are at least four pairs comprising feature points and smoothing points (step S11). In this exemplary embodiment, the projection conversion coefficient acquirer 111 determines whether or not there are at least four pairs comprising feature points and smoothing points in the image 10 of FIG. 3. When there are not at least four pairs (step S11: No), it is not possible to find provisional coefficients for projection conversion, so the process promptly ends.

On the other hand, when there are at least four pairs (step S11: Yes), the reference point selector 116 selects one of the reference points, out of the plurality of reference points (step S12). In this exemplary embodiment, the reference point selector 116 selects either the right reference point or the left reference point. Below, the description takes as an example a case in which the left reference point was selected first.

Next, the feature point weight setter 117 sets weightings in accordance with the distance from the one reference point that was selected, for all feature points (step S13). In this exemplary embodiment, the feature point setter 117 sets weightings (w) differing in accordance to distance from the left reference point, for the respective coordinates of all 64 feature points contained in the image 10, using equation (1), as in the above-described outline (see FIG. 5).

Next, the provisional coefficient acquirer 118 randomly selects four pairs comprising feature points and smoothing points (step S14). Then, the provisional coefficient acquirer 118 acquires the provisional coefficients, based on the selected four pairs (step S15). In this exemplary embodiment, the provisional coefficient acquirer 118 acquires the provisional coefficients (a, b, c, d, e, f, g, h) by substituting the coordinates of the four pairs of feature points and smoothing points into equation (2), as in the above-described outline.

Next, the weighting multiplier 119 does projection conversion on all of the feature points, using the provisional coefficients (step S16). In this exemplary embodiment, the weighting multiplier 119 does projection conversion on the coordinates (x1, y1)~(x64, y64) of all 64 feature points in the image 10 through equation (3), using the acquired provisional coefficients (a, b, c, d, e, f, g, h), as in the above-described outline.

Next, the weighting multiplier 119 multiplies the weighting (w) by the respective distances between all feature points after projection conversion and the smoothing points respectively paired with all of the feature points (step S17). In this exemplary embodiment, the weighting multiplier 119 multiplies the weightings (w) set for the coordinates (x1, y1)~(x64, y64) of all of the feature points by the respective distances between the coordinates (x'1, y'1)~(x'64, y'64) of all of the feature points after projection conversion and the coordinates (X1, Y1)~(X64, Y64) of the smoothing points respectively paired with all of the feature points, as in the above-described outline.

Next, the weighting multiplier 119 calculates the sum of the values of the distances respectively multiplied by the weightings (step S18). Next, the determiner 120 determines whether or not the calculated sum is a minimum (step S19). Specifically, the determiner 120 determines which out of the sum calculated using the current provisional coefficients and the sum calculated using the different provisional coefficients of the previous time is smaller.

If the sum calculated using the current provisional coefficients is smaller (step S19: Yes), the determiner 120 temporarily stores the coefficients as projection conversion coefficients (step S20) and proceeds to step S21. On the other hand, if the sum calculated using the provisional coefficients of the previous time is a minimum (step S19: No), the determiner 120 skips step S20 and proceeds to step S21.

In step S21, the projection conversion coefficient acquirer 111 determines whether or not the stipulated number of times has ended (step S21). When the stipulated number of times has not ended (step S21: No), the process from steps S14 through S20 is repeated until the stipulated number of times (for example, 500 times) has ended (step S21: Yes).

By repeating this process, the provisional coefficient for which a feature point close to the reference point becomes closest to the smoothing point (in other words, with strong power to cause the feature point to come to the smoothing point the closer to the reference point) while all feature points approach the smoothing point, from among the plurality of coefficients found by changing pairs, is selected as the one projection conversion coefficient for the one reference point. That is to say, the optimal projection conversion coefficient is sought by looping the process from step S14 through step S20 until a stipulated number of times is reached.

Making the feature point approach the smoothing point the nearer to the reference point is accomplished by introducing the concept of weighting. Specifically, in this exemplary embodiment, the provisional coefficient for which the sum of the distances (differences) simply becomes smallest is not found, but rather by making the penalty larger when a difference emerges after setting weightings to be greater near the reference point, provisional coefficients such that feature points do not approach the smoothing points near the reference points are excluded. Consequently, it is possible to select the projection conversion coefficients having the highest precision in projection conversion the closer to the reference points.

Now, after the process from step S14 through step S20 has been looped until the stipulated number of times is reached, the determiner 120 decides on one projection conversion coefficient for the selected one reference point (step S22). In this exemplary embodiment, the determiner 120 decides on one projection conversion coefficient for the left reference point selected first.

Figure 7:
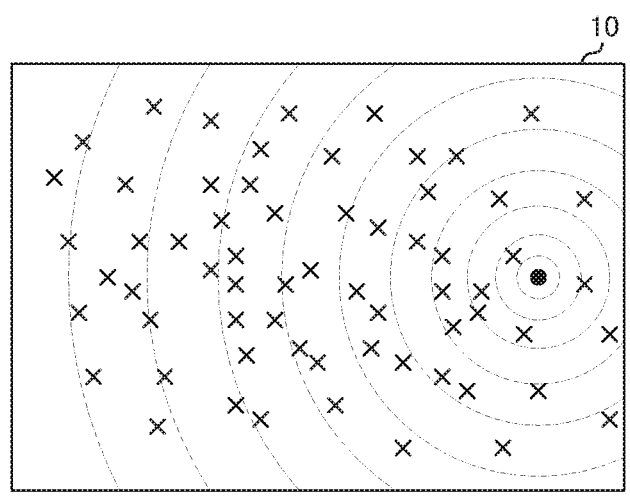
FIG. 7 is a drawing showing one example of weighting from a right reference point.

Next, the reference point selector 116 determines whether or not all reference points have been selected (step S23). If all reference points have not been selected (step S23: No), the reference point selector 116 returns to step S12 and selects one reference point from the reference points excluding reference points that have been selected. In this exemplary embodiment, the reference point selector 116 selects the right reference point. Then, the feature point weighting setter 117 sets weightings in accordance with distances from the right reference point for all feature points, as shown in FIG. 7 (step S13). Following this, the process from steps S14 through S20 is repeated until the stipulated number of times ends, and one projection conversion coefficient for the right reference point is decided (step S22). When all reference points have been selected (step S23: Yes), the process concludes.

Through this projection conversion coefficient acquisition process, the process of acquiring the same number of projection conversion coefficients as the plurality of reference points in the figure in the above-described (1) concludes. Next, the process of (2) above for accomplishing projection conversion of the image using the same number of projection conversion coefficients as the acquired reference points, and (3) making a weighted average of the coordinates of the pixels comprising the same number of post-projection-conversion images as the reference points, using the same number of weightings as the reference points, will be described with reference to the weighted average image acquisition process of FIG. 8. As a prerequisite, suppose that the projection conversion coefficient for the right reference point and the projection conversion coefficient for the left reference point have been decided. The weighted average image acquisition process may start immediately after conclusion of the projection conversion coefficient acquisition process, or may start on the basis of a command from the user.

First, the pixel weighting setter 112 sets a plurality of weightings in accordance with distances from the plurality of reference points, for the pixel coordinates (step S31). Specifically, the pixel weighting setter 112 sets two differing weightings in accordance with the distances from the two reference points (the right reference point and the left reference point) for the coordinates $(x_i, y_i)$ of the pixels comprising the image 10.

Next, the pixel weighting setter 112 determines whether or not weightings were set for the coordinates or all pixels (step S32). When weightings have not been set for the coordinates of all pixels (step S32: No), the process of step S31 is repeated until weightings have been set for the coordinates of all pixels. Through this process, two weightings are set for the coordinates $(x_{imin~imax}, y_{imin~imax})$ of each of the pixels of the image 10.

Figure 9:
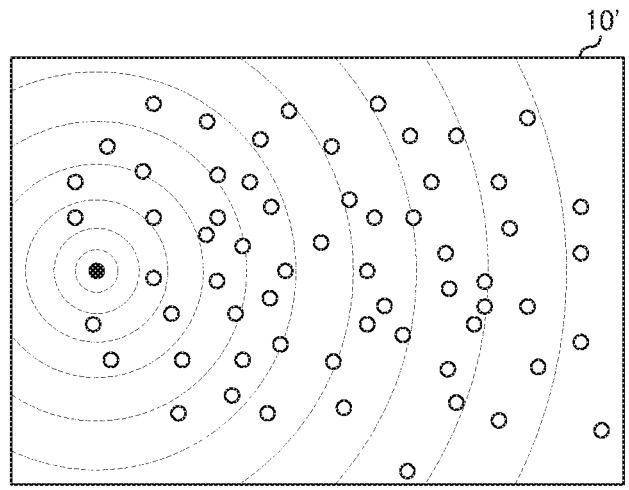
FIG. 9 is a drawing showing one example of an image that has undergone projection conversion through projection conversion coefficients acquired from the left reference point.

Next, the post-projection-conversion coefficient acquirer 113 selects one projection conversion coefficient from among the plurality of projection conversion coefficients established (step S33). Then, the post-projection-conversion image acquirer 113 does projection conversion on the image, through the selected projection conversion coefficient (step S34). For example, when the post-projection-conversion image acquirer 113 does projection conversion on the image using the projection conversion coefficient for the left reference point, projection conversion is done on the coordinates $(x_i, y_i)$ of each of the pixels of the image 10 using equation (3). In addition, an image comprising pixels of post-projection-conversion coordinates $(x'_i, y'_i)$ is the post-projection-conversion image. FIG. 9 shows an image 10' that has undergone projection conversion using the projection conversion coefficient for the left reference point. In this drawing, the white dots indicate positions that approached the smoothing points by the pre-projection-conversion feature points (x's) undergoing projection conversion.

Next, the weighted averager 114 calculates weightings set for all of the coordinates for all of the pixels in the original image, respectively for all of the coordinates of all of the pixels of the post-projection-conversion image (step S35). For example, the weighted averager 114 multiplies the weighting (for example w') in accordance with distance from the left reference point set for the coordinates $(x_i, y_i)$ of the pixels in the original image 10, by the coordinates $(x'_i, y'_i)$ of the pixels in the post-projection-conversion image 10'. Through this, the value of the coordinates becomes $(w'x'_i, w'y'_i)$. The weighted averager 114 respectively multiplies the weighting by the coordinates $(x'_{imin\sim imax}, y'_{imin\sim imax})$ of all of the pixels of the post-projection-conversion image 10'.

Next, the post-projection-conversion image acquirer 113 determines whether or not all projection conversion coefficients have been selected (step S36). When all projection conversion coefficients have not been selected (step S36: No), the post-projection-conversion image acquirer 113 returns to step S33 and selects one projection conversion coefficient from among the projection conversion coefficients excluding the projection conversion coefficients that have already been selected. In this exemplary embodiment, the post-projection-conversion image acquirer 113 selects the projection conversion coefficient of the right reference point.

Figure 10:
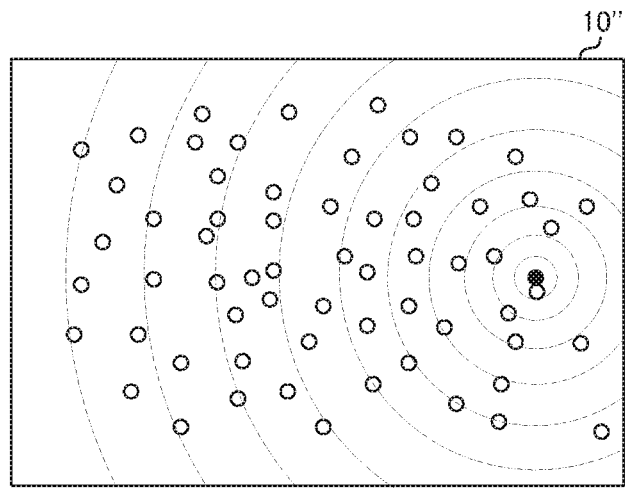
FIG. 10 is a drawing showing one example of an image that has undergone projection conversion through projection conversion coefficients acquired from the right reference point.

Then, the post-projection-conversion image acquirer 113 accomplishes projection conversion of the image 10, in step S34 in the above-described outline (see FIG. 10). FIG. 10 shows an image 10" that has undergone projection conversion using the projection conversion coefficient of the right reference point. Next, the weighted averager 114 multiplies the weighting (for example w") in accordance with distance from the right reference point set for the coordinates $(x_i, y_i)$ of the pixels in the original image 10, by the coordinates $(x''_i, y''_i)$ of the pixels in the post-projection-conversion image 10". Through this, the value of the coordinates becomes $(w''x''_i, w''y''_i)$. The weighted averager 114 respectively multiplies the weighting by the coordinates $(x''_{imin\sim imax}, y''_{imin\sim imax})$ of all of the pixels of the post-projection-conversion image 10".

When it is determined that all of the projection conversion coefficients have been selected (step S36: Yes), the weighted averager 114 makes a weighted average of the respective coordinates of the pixels comprising the post-projection-conversion image (step S37). In this exemplary embodiment, the weighted averager 114 makes a weighted average through weightings (w' and w") of the post-projection-conversion images 10' and 10". Specifically, a weighted average is made of the coordinates $(w'x'_i, w'y'_i)$ and $(w''x''_i, w''y''_i)$ of the corresponding pixels in the one image 10' and the other image 10".

The value of i in the coordinates of the corresponding pixels is the same as the value of i in the original pixels $(x_i, y_i)$ in the original image 10. The coordinates after weighted averaging become $(w'x'_i + w''x''_i/w' + w'', +w''y''_i/w' + w'')$. The weighted averager 114 makes a weighted average for the coordinates of all corresponding pixels, that is to say $(w'x'_{imin\sim imax}, w'y'_{imin\sim imax})$ an $w''x''_{imin\sim imax}, w''y''_{imin\sim imax})$.

Here, w' indicates the weighting corresponding to the distance from the left reference point of the image 10, w" indicates the weighting corresponding to the distance from the right reference point of the image 10, $(x'_{imin\sim imax}, y'_{imin\sim imax})$ indicates all of the coordinates of all of the pixels in the image 10' that has undergone projection conversion through the projection conversion coefficient corresponding to the left reference point, and $(x''_{imin\sim imax}, y''_{imin\sim imax})$ indicates all of the coordinates of all of the pixels in the image 10" that has undergone projection conversion through the projection conversion coefficient corresponding to the right reference point.

Figure 11:
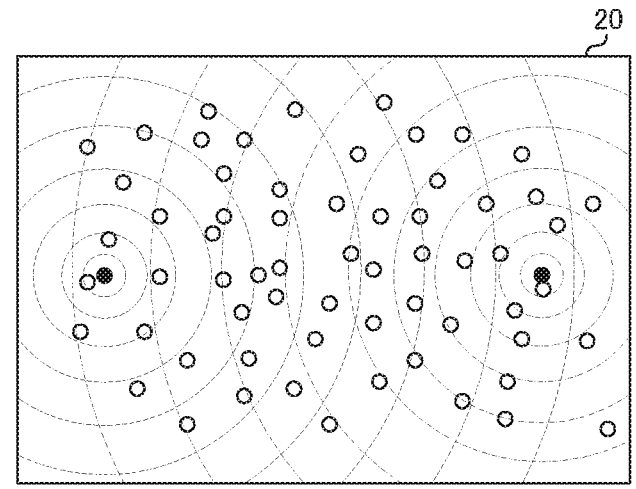
FIG. 11 is a drawing showing one example of a weighted average image.

Next, the weighted average image acquirer 115 acquires the weighted average image (step S38). Specifically, the weighted average image acquirer 115 acquires the weighted average image 20 shown in FIG. 11, comprising pixels that are a weighted average for coordinates of all corresponding pixels.

The exemplary embodiment was described taking the image 10 as an example, but the series of processes (the projection conversion coefficient acquisition process and the weighted average process) comprising each of the processes of all of the components (the projection conversion coefficient acquirer 111, the pixel weighting setter 112, the post-projection-conversion image acquirer 113, the weighted averager 114 and the weighted average image acquirer 115) is repeated for each of the images in the frames comprising the video 131. When this is undertaken, the position of the plurality reference points (in this exemplary embodiment, the positions of the left reference point and the right reference point) may be common positions through all of the images.

With the image processing apparatus 100 according to this exemplary embodiment, by providing the various components for projection conversion components (the projection conversion coefficient acquirer 111, the pixel weighting setter 112, the post-projection-conversion image acquirer 113, the weighted averager 114 and the weighted average image acquirer 115), first projection conversion coefficients such that the closer to the reference point, the closer to the smoothing point, that is to say for accomplishing projection conversion with high accuracy, are acquired in the same number as the number of reference points. Then, a weighted average is made of the coordinates of the pixels comprising the pixels that have undergone projection conversion through each of the projection conversion coefficients.

Consequently, when compared to an image that has undergone projection conversion simply just one time without reference points, with a weighted average image unevenness does not appear in the accuracy of the projection conversion, that is to say reasonable image conversion is accomplished in all areas of the image. Consequently, it is possible to avoid situations such as an inclination for the accuracy of projection conversion to worsen at spots inside the image, or for jittering to emerge near the image edges.

In addition, by making a weighted average, it is possible to approximate a curve by pulling straight lines in the image from two reference points. Consequently, a curved projection effect is obtained through projection conversion of a planar projection. Accordingly, it is possible to generate an image that is close to the appearance actually observed when taking parallax into consideration.

Because the projection conversion coefficient acquisition process and the weighted average process are done on a plurality of images comprising the video, it is possible to generate a video in which jittering is suppressed and there is no discomfort in appearance while correcting for blurring.

In addition, in this exemplary embodiment, the two reference positions are respectively positioned close to two opposite sides out of the four sides of the image 10. Consequently, it is possible to obtain a curved projection effect by mutually pulling with differing forces on areas (the right region or left region of the image) excluding the central area of the image in which the mutual forces compete in the weighted average image 20, while increasing the accuracy of projection conversion near the edges of the image. Accordingly, it is possible to obtain a video that appears natural while covering accurate projection conversion uniformly throughout the entire image.

In addition, when acquiring projection conversion coefficients by the projection conversion coefficient acquirer 111, weighting is set heavier the closer to the reference points and the penalty when a difference emerges between the post-projection-conversion feature points and smoothing points becomes larger. Consequently, it is possible to increase the accuracy of projection conversion near the reference points, by excluding provisional coefficients such that the smoothing points are not approached near the reference points.

In addition, the projection conversion coefficient acquirer 111 according to this exemplary embodiment finds the final projection conversion coefficients from four pairs arbitrarily selected from all feature points in the image. Consequently, when compared to a case in which an image is partitioned into a plurality of areas and the image undergoes projection conversion through projection conversion coefficients found from feature points included in only the partitioned areas, it is possible to control the occurrence of unnatural joints such as image partitioning.

In addition, the projection conversion coefficient acquisition process according to this exemplary embodiment adds a process according to weighting in the optimization process of steps S14 through S21 (the so-called Random Sample Consensus (RANSAC) method). Because the process according to this weighting comprises a plurality of steps, the projection conversion coefficient acquisition process is possible even with a processing unit having low processing capabilities, and low-power-consumption driving of this process is possible.

Figure 6:
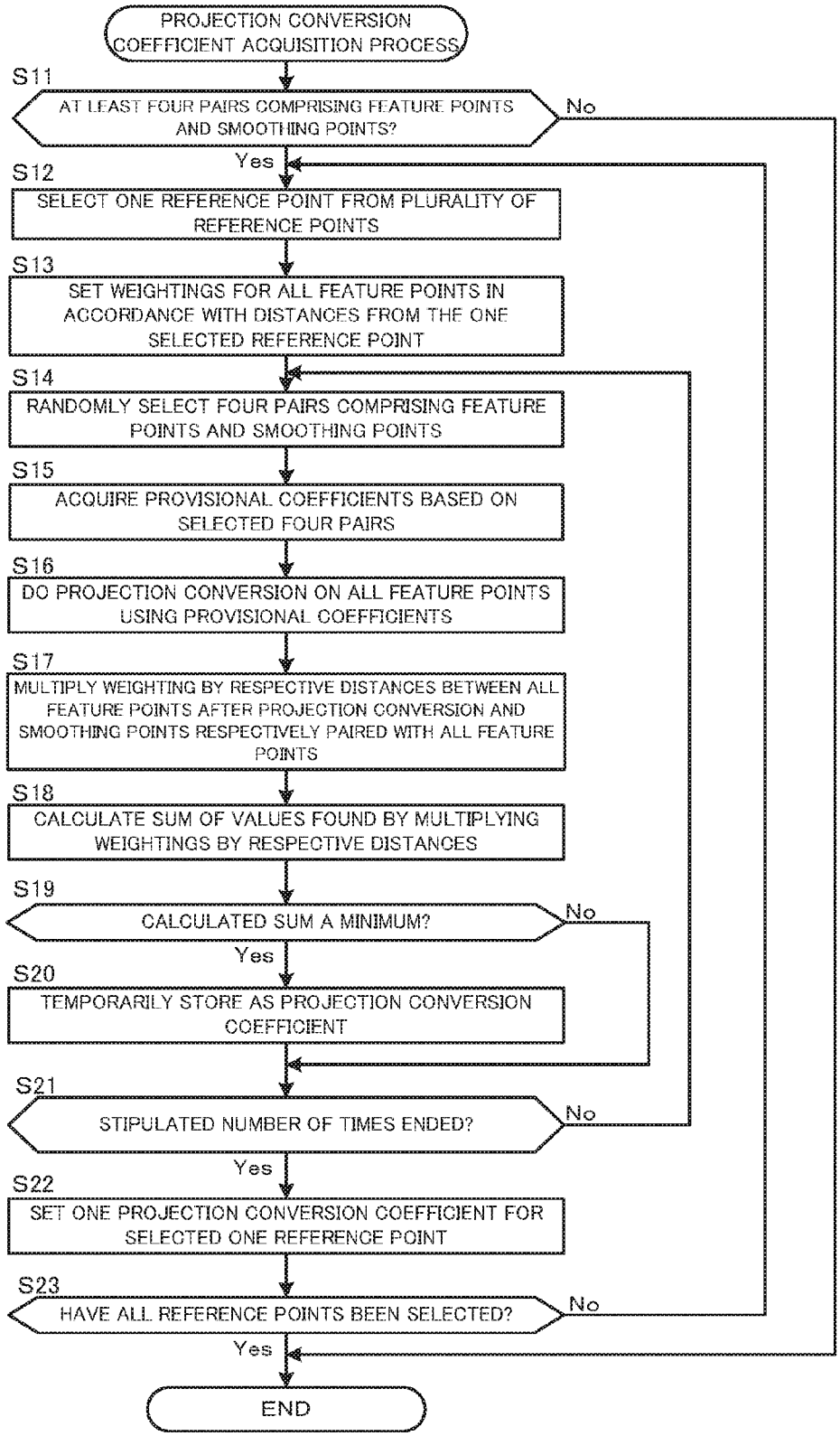
FIG. 6 is a flowchart showing one example of the flow of a projection conversion coefficient acquisition process.
Figure 8:
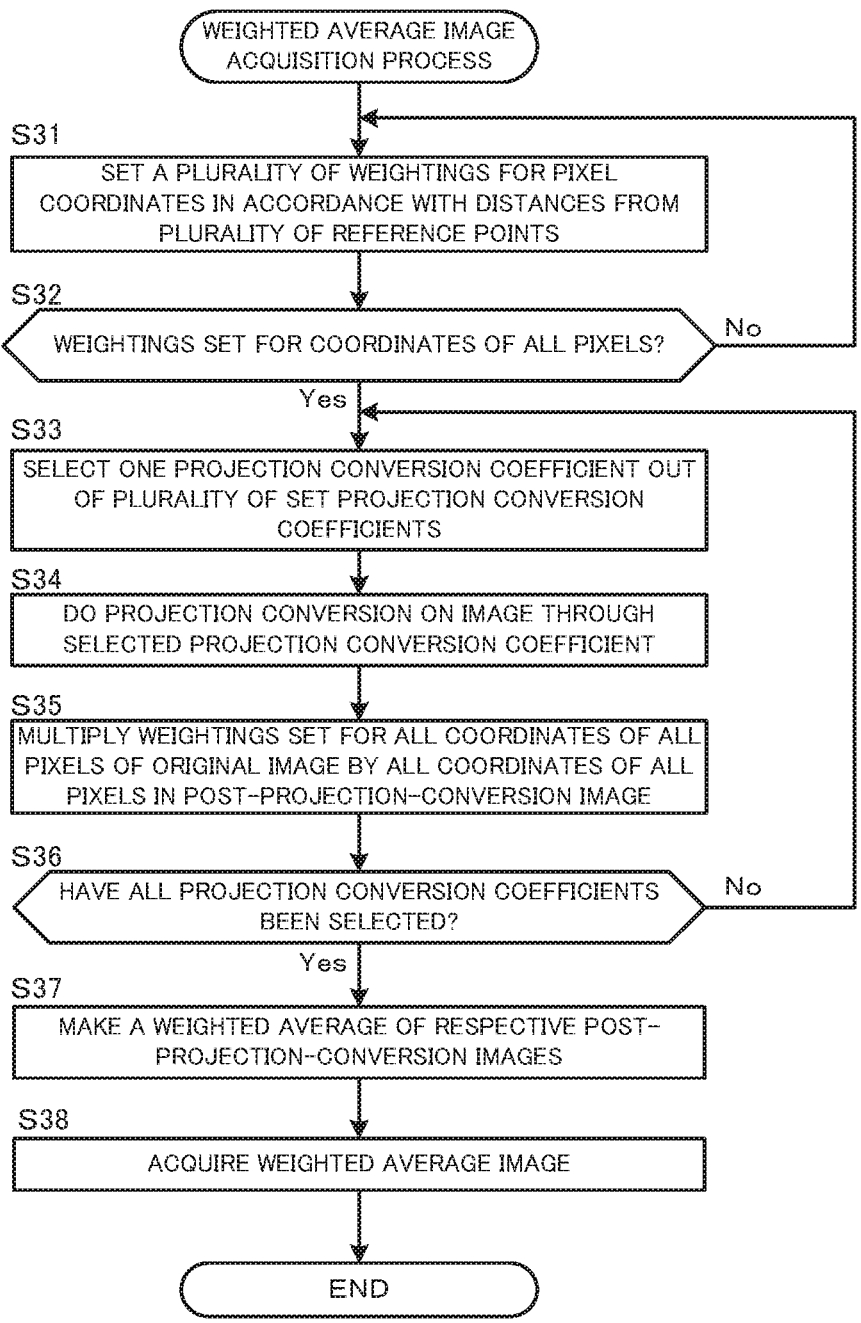
FIG. 8 is a flowchart showing one example of a weighted average image acquisition process.

This concludes the description of the exemplary embodiment, but naturally the specific configuration of the image processing apparatus 100 and the contents of the projection conversion coefficient acquisition process and the weighted average process shown in FIG. 6 and FIG. 8 are not limited by the above description of the exemplary embodiment.

For example, in the above-described exemplary embodiment, the description was made on the assumption that there are two reference points, but this is intended to be illustrative and not limiting. For example, when there are four reference points, it would be fine to position the reference points in the four corners of the image 10 from the perspective of increasing the coverage rate of projection conversion accuracy. In this case, four projection conversion coefficients are acquired by the projection conversion coefficient acquisition process, and a weighted average is done by the weighted average process for the coordinates of the pixels comprising the four post-projection-conversion images. There are four corresponding pixels corresponding in the four post-projection-conversion images, and it would be fine for a weighted average of these to be made using four weightings, being the same number as the number of reference points.

In addition, the image processing apparatus 100 according to the above-described exemplary embodiment was described under the assumption of being a PC, but this is intended to be illustrative and not limiting. For example, it would be fine for a capturing apparatus to comprise the functions of the various components of the image processing apparatus 100 and to accomplish the projection conversion coefficient acquisition process and the weighted average process. In this case, if the projection conversion coefficient acquisition process and the weighted average process are accomplished in real time while the user is recording the video, it is possible to control jittering and also mitigate blur correction in the video in live view.

In addition, the various functions of the image processing apparatus 100 of this disclosure can be implemented through a computer such as a regular PC and/or the like. Specifically, in the above-described exemplary embodiment, the program for projection conversion was described as stored in advance in the ROM of the controller 110. However, it would be fine to configure a computer that can realize the functions of the above-described components by having a program for realizing the functions of the various components in FIG. 1 stored and distributed on a non-transitory computer-readable recording medium such as a flexible disk, a compact disc read only memory (CD-ROM), a digital versatile disc (DVD), a magneto-optical (MO) disc and/or the like, and for the program to be installed on the computer.

In addition, it would also be fine for the program to be stored on a disk device and/or the like possessed by a server device on a communication network such as the Internet and/or the like, and for example for a computer to be capable of downloading such.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image processing apparatus comprising:
   a memory for storing an executable program; and
   a processor configured to execute the program to perform the following processes:
   a projection conversion coefficient acquisition process that acquires projection conversion coefficients that are coefficients for doing projection conversion on an image, the number of such coefficients being the same as the number of a plurality of reference points at differing positions in the image;
   a post-projection-conversion image acquisition process that does projection conversion on the image through the respective projection conversion coefficients of the same number as the number of the plurality of reference points, acquired by the projection conversion coefficient acquisition process, and acquires the same number of post-projection-conversion images from the image as the number of the reference points;
   a setting process that sets, for coordinates of pixels comprising the image, a plurality of weightings that differ in accordance with distances from the coordinates to the plurality of reference points;
   a weighted average process that makes a weighted average of coordinates of corresponding pixels corresponding among the plurality of post-projection-conversion images, using a plurality of weightings set by the setting process for coordinates of original pixels of the corresponding pixels in the image; and
   a weighted average image acquisition process that acquires a weighted average image comprising pixels with coordinates after weighted averaging by the weighted average process.

2. The image processing apparatus according to claim 1, wherein the projection conversion coefficient acquisition process acquires the same number of projection conversion coefficients as the number of a plurality of reference points respectively positioned near two opposite sides out of the four sides of the image.

3. The image processing apparatus according to claim 1, wherein:

the image contains at least four or more pairs comprising feature points indicating features of the image and smoothing points on smoothing trajectories that smooth feature point trajectories of the feature points in video containing the image as a frame; and the projection conversion coefficient acquisition process includes:

a selection process that selects one reference point, from among the plurality of reference points;

a weighting setting process that sets weightings that differ in accordance with the distance from one reference point selected by the selection process, for the respective coordinates of all feature points contained in the image;

a provisional coefficient acquisition process that acquires a provisional coefficient for projection conversion, on the basis of four arbitrarily selected pairs out of the plurality of pairs comprising the smoothing points and the feature points included in the image;

a weighting multiplication process that multiplies the respective distances between the post-projection-conversion coordinates of all of the feature points obtained through projection conversion of the coordinates of all of the feature points using the provisional coefficient acquired by the provisional coefficient acquisition process, and the coordinates of the smoothing points respectively paired with the feature points, by weightings set for the respective coordinates of all of the feature points; and a determination process that determines whether the provisional coefficient is set as one projection conversion coefficient for the one reference point that was selected, on the basis of the sum of values found by the weighting multiplication process multiplying the respective distances by the weightings.

4. The image processing apparatus according to claim 3, wherein the determination process sets a provisional coefficient whose sum is a minimum as one projection conversion coefficient corresponding to the one reference point that was selected, out of the plurality of provisional coefficients that the provisional coefficient acquisition process acquired by changing at least one pair out of the four pairs to a pair differing from the four pairs.

5. The image processing apparatus according to claim 3, wherein the projection conversion coefficient acquisition process repeats a projection conversion coefficient acquisition process comprising the weighting setting process, the provisional coefficient acquisition process, the weighting multiplication process and the determination process each time the selection process selects one reference point, acquires one projection conversion coefficient for the one reference point that was selected, and acquires the same number of projection conversion coefficients as the number of the plurality of reference points.

6. The image processing apparatus according to claim 1 wherein:

the processor executes the program to perform a repeating process that repeats, for each image that is a frame comprising a video, a series of processes comprising the projection conversion coefficient acquisition process, the post-projection-conversion image acquisition process, the weighted average process and the weighted average image acquisition process.

7. An image processing method comprising:

a plurality of steps each performed by a processor as follows:

a projection conversion coefficient acquisition step that acquires projection conversion coefficients that are coefficients for doing projection conversion on an image, the number of such coefficients being the same as the number of a plurality of reference points at differing positions in the image;

a post-projection-conversion image acquisition step that does projection conversion on the image through the respective projection conversion coefficients of the same number as the number of the plurality of reference points, acquired by the projection conversion coefficient acquisition step, and acquires the same number of post-projection-conversion images from the image as the number of the reference points;

a setting step that sets, for coordinates of pixels comprising the image, a plurality of weightings that differ in accordance with distances from the coordinates to the plurality of reference points;

a weighted average step that makes a weighted average of coordinates of corresponding pixels corresponding among the plurality of post-projection-conversion images, using a plurality of weightings set by the setting step for coordinates of original pixels of the corresponding pixels in the image; and a weighted average image acquisition step that acquires a weighted average image comprising pixels with coordinates after weighted averaging by the weighted average step.

8. The image processing method according to claim 7, wherein the projection conversion coefficient acquisition step acquires the same number of projection conversion coefficients as the number of a plurality of reference points respectively positioned near two opposite sides out of the four sides of the image.

9. The image processing method according to claim 7, wherein:

the image contains at least four or more pairs comprising feature points indicating features of the image and smoothing points on smoothing trajectories that smooth feature point trajectories of the feature points in video containing the image as a frame; and the projection conversion coefficient acquisition step includes:

a selection step that selects one reference point, from among the plurality of reference points;

a weighting setting step that sets weightings that differ in accordance with the distance from one reference point selected by the selection step, for the respective coordinates of all feature points contained in the image;

a provisional coefficient acquisition step that acquires a provisional coefficient for projection conversion, on the basis of four arbitrarily selected pairs out of the plurality of pairs comprising the smoothing points and the feature points included in the image;

a weighting multiplication step that multiplies the respective distances between the post-projection-conversion coordinates of all of the feature points obtained through projection conversion of the coordinates of all of the feature points using the provisional coefficient acquired by the provisional coefficient acquisition step, and the coordinates of the smoothing points respectively paired with the feature points, by weightings set for the respective coordinates of all of the feature points; and a determination step that determines whether the provisional coefficient is set as one projection conversion coefficient for the one reference point that was selected, on the basis of the sum of values found by the weighting multiplication step multiplying the respective distances by the weightings.

10. The image processing method according to claim 9, wherein the determination step sets a provisional coefficient whose sum is a minimum as one projection conversion coefficient corresponding to the one reference point that was selected, out of the plurality of provisional coefficients that the provisional coefficient acquisition step acquired by changing at least one pair out of the four pairs to a pair differing from the four pairs.

11. The image processing method according to claim 9, wherein the projection conversion coefficient acquisition step repeats a projection conversion coefficient acquisition step comprising the weighting setting step, the provisional coefficient acquisition step, the weighting multiplication step and the determination step each time the selection step selects one reference point, acquires one projection conversion coefficient for the one reference point that was selected, and acquires the same number of projection conversion coefficients as the number of the plurality of reference points.

12. The image processing method according to claim 7, including a repeating step that repeats, for each image that is a frame comprising a video, a series of steps comprising the projection conversion coefficient acquisition step, the post-projection-conversion image acquisition step, the weighted average step and the weighted average image acquisition step.

13. A non-transitory computer-readable medium on which is recorded a program for causing a computer possessing an image processing apparatus to execute:
 a projection conversion coefficient acquisition process that acquires projection conversion coefficients that are coefficients for doing projection conversion on an image, the number of such coefficients being the same as the number of a plurality of reference points at differing positions in the image;
 a post-projection-conversion image acquisition process that does projection conversion on the image through the respective projection conversion coefficients of the same number as the number of the plurality of reference points, acquired by the projection conversion coefficient acquisition process, and acquires the same number of post-projection-conversion images from the image as the number of the reference points;
 a setting process that sets, for coordinates of pixels comprising the image, a plurality of weightings that differ in accordance with distances from the coordinates to the plurality of reference points;
 a weighted average process that makes a weighted average of coordinates of corresponding pixels corresponding among the plurality of post-projection-conversion images, using a plurality of weightings set by the setting process for coordinates of original pixels of the corresponding pixels in the image; and
 a weighted average image acquisition process that acquires a weighted average image comprising pixels with coordinates after weighted averaging by the weighted average process.

14. The non-transitory computer-readable medium according to claim 13, wherein the projection conversion coefficient acquisition process acquires the same number of projection conversion coefficients as the number of a plurality of reference points respectively positioned near two opposite sides out of the four sides of the image.

15. The non-transitory computer-readable medium according to claim 13, wherein:
 the image contains at least four or more pairs comprising feature points indicating features of the image and smoothing points on smoothing trajectories that smooth feature point trajectories of the feature points in video containing the image as a frame; and
 the projection conversion coefficient acquisition process includes:
 a selection process that selects one reference point, from among the plurality of reference points;
 a weighting setting process that sets weightings that differ in accordance with the distance from one reference point selected by the selection process, for the respective coordinates of all feature points contained in the image;
 a provisional coefficient acquisition process that acquires a provisional coefficient for projection conversion, on the basis of four arbitrarily selected pairs out of the plurality of pairs comprising the smoothing points and the feature points included in the image;
 a weighting multiplication process that multiplies the respective distances between the post-projection-conversion coordinates of all of the feature points obtained through projection conversion of the coordinates of all of the feature points using the provisional coefficient acquired by the provisional coefficient acquisition process, and the coordinates of the smoothing points respectively paired with the feature points, by weightings set for the respective coordinates of all of the feature points; and
 a determination process that determines whether the provisional coefficient is set as one projection conversion coefficient for the one reference point that was selected, on the basis of the sum of values found by the weighting multiplication process multiplying the respective distances by the weightings.

16. The non-transitory computer-readable medium according to claim 15, wherein the determination process sets a provisional coefficient whose sum is a minimum as one projection conversion coefficient corresponding to the one reference point that was selected, out of the plurality of provisional coefficients that the provisional coefficient acquisition process acquired by changing at least one pair out of the four pairs to a pair differing from the four pairs.

17. The non-transitory computer-readable medium according to claim 15, wherein the projection conversion coefficient acquisition process repeats a projection conversion coefficient acquisition process comprising the weighting setting process, the provisional coefficient acquisition process, the weighting multiplication process and the determination process each time the selection process selects one reference point, acquires one projection conversion coefficient for the one reference point that was selected, and acquires the same number of projection conversion coefficients as the number of the plurality of reference points.

* * * * *